United States Patent [19]

Beachy

[11] 4,095,662
[45] Jun. 20, 1978

[54] GARDEN TRACTOR
[76] Inventor: Alvin S. Beachy, Salisbury, Pa. 15558
[21] Appl. No.: 746,019
[22] Filed: Nov. 30, 1976
[51] Int. Cl.² .............................................. B62D 55/00
[52] U.S. Cl. .................................... 180/9.22; 172/258
[58] Field of Search .................... 180/9.22, 9.62, 9.64; 172/258; 305/11, 13, 35 R

[56] References Cited
U.S. PATENT DOCUMENTS

| 1,302,317 | 4/1919 | Cowan | 180/9.22 |
|---|---|---|---|
| 1,353,318 | 9/1920 | Cowan | 180/9.22 |
| 2,289,768 | 7/1942 | Fehrenbacher | 305/11 |
| 2,388,981 | 11/1945 | Kuntz | 172/258 |
| 2,512,443 | 6/1950 | Shelor | 172/258 |
| 2,529,369 | 11/1950 | Beachy | 172/258 |
| 2,581,587 | 1/1952 | Gray | 180/9.22 |
| 3,637,035 | 1/1972 | Washburn | 180/9.64 |
| 3,690,396 | 9/1972 | Colosimo | 180/9.64 |
| 3,834,477 | 9/1974 | Sandow | 180/9.64 |
| 4,026,373 | 5/1977 | Martinez | 180/9.22 |

Primary Examiner—Robert R. Song
Assistant Examiner—John A. Carroll

[57] ABSTRACT

A garden tractor of the type steered by a walking attendant having a strong central structure in the form of a pair of rectangular plates rigidly interconnected by a centrally located cylindrical member extending transversely therebetween which is conveniently utilized (1) to mount an endless ground-engaging track assembly in a position between the plates so that the endless path of movement thereof encircles the cylindrical member; (2) to support an engine and handle frame assembly thereabove for pivotal movement about the relatively low axis of the cylindrical member; and (3) to mount a rotary motion transmitting shaft concentrically within the cylindrical member which serves to transmit the rotary power from the engine to the endless track assembly while accommodating the aforesaid pivotal movement of the engine and handle frame which carries the cultivator tools.

8 Claims, 5 Drawing Figures

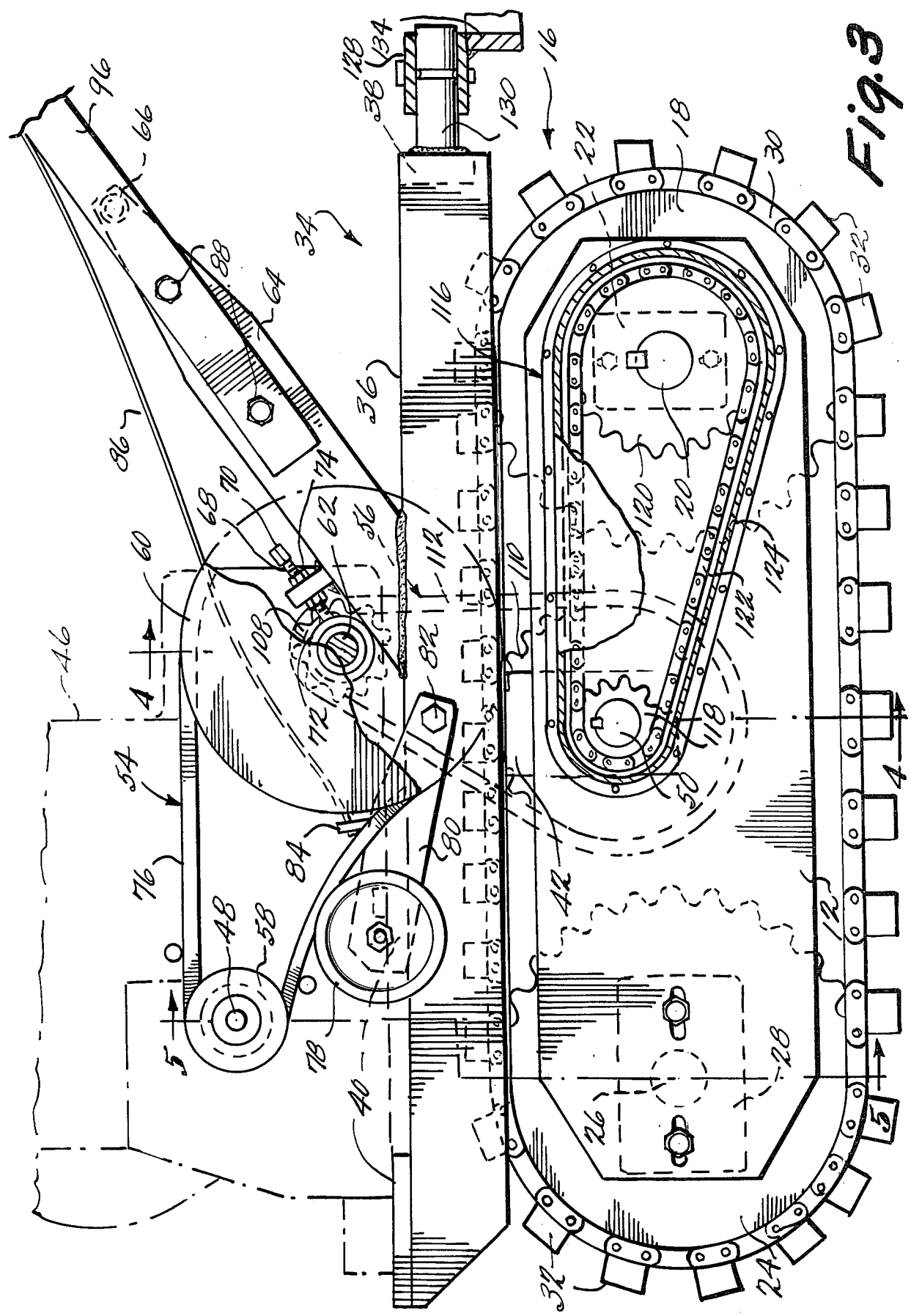

GARDEN TRACTOR

This invention relates to garden tractors and more particularly to improvements in garden tractors of the cultivator type steered by a walking attendant.

Cultivating garden tractors of a type herein contemplated are well known in the art. An exemplary arrangement of this type which has received a measure of commercial acceptance is disclosed in Beachy U.S. Pat. No. 2,529,369 issued Nov. 7, 1950. While the tractor as disclosed in the aforesaid patent has been commercially accepted there is always a need to effect manufacturing cost reduction, particularly where such cost reduction can be achieved with an increase in, or at least without an attendant reduction in, the operating efficiency or durability of the apparatus.

An object of the present invention is the provision of an improved garden tractor construction which will satisfy the needs identified above. In accordance with the principles of the present invention this objective is obtained by providing a strong central structure in the form of a pair of rectangular plates rigidly interconnected by a centrally located cylindrical member extending transversely therebetween which is conveniently utilized (1) to mount the endless ground-engaging track assembly in a position between the plates so that the endless path of movement thereof encircles the cylindrical member; (2) to support the engine and handle frame assembly thereabove for pivotal movement about the relatively low axis of the cylindrical member; and (3) to mount a rotary motion transmitting shaft concentrically within the cylindrical member which serves to transmit the rotary power from the engine to the endless track assembly while accommodating the aforesaid pivotal movement of the engine and handle frame which carries the cultivator tools.

Another object of the present invention is the provision of an improved garden tractor of the type described which is simple in construction, effective and durable in operation and economical to manufacture and maintain.

These and other objects of the present invention will become more apparent during the course of the following detailed description and appended claims.

The invention may best be understood with reference to the accompanying drawings, wherein an illustrative embodiment is shown.

In the drawings:

FIG. 3 is an enlarged fragmentary side elevational view of the garden tractor with certain parts broken away for purposes of clearer illustration;

FIG. 4 is a fragmentary sectional view taken along the line 4—4 of FIG. 3; and

Figure 1:
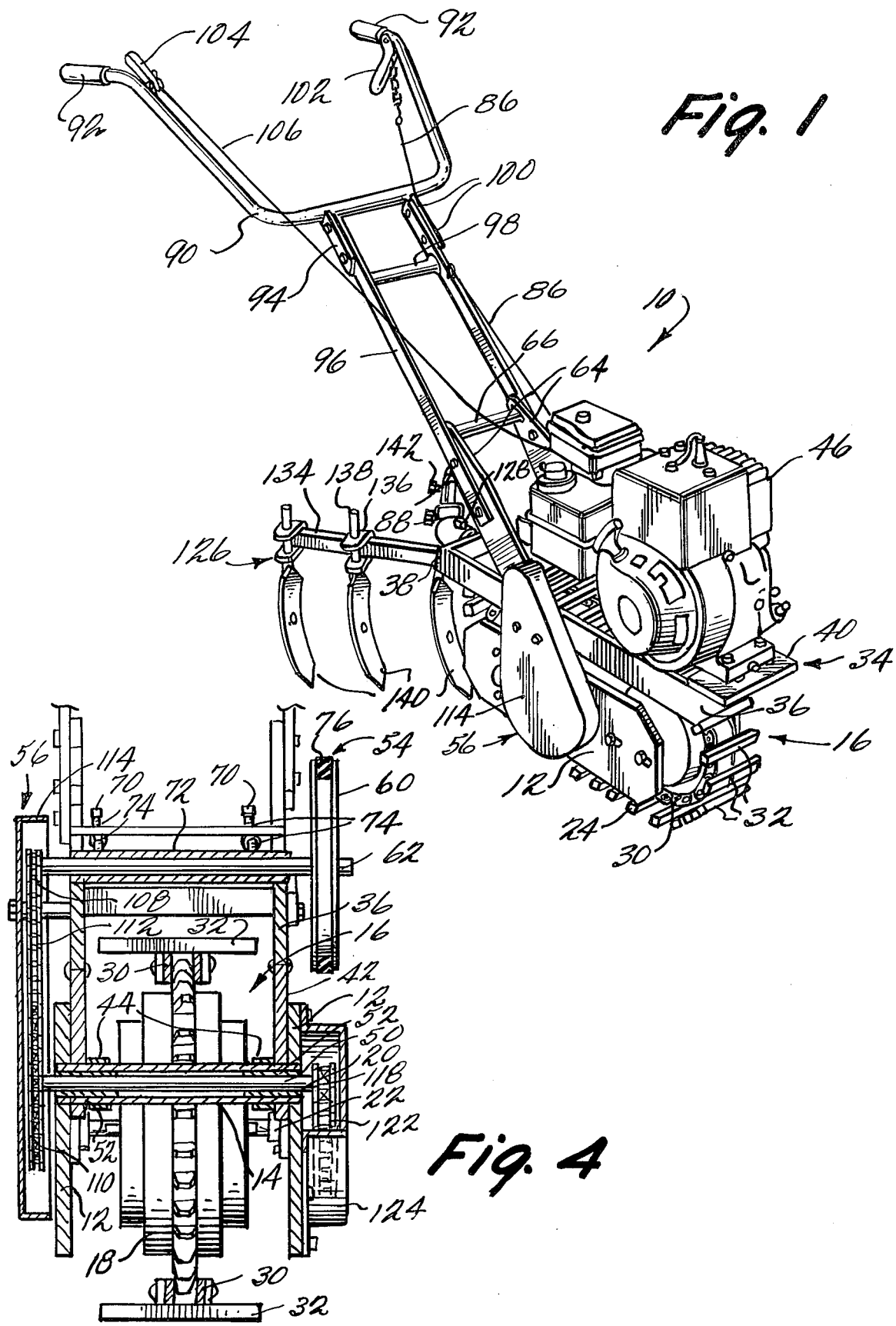
FIG. 1 is a perspective view of a garden tractor embodying the principles of the present invention.
Figure 2:
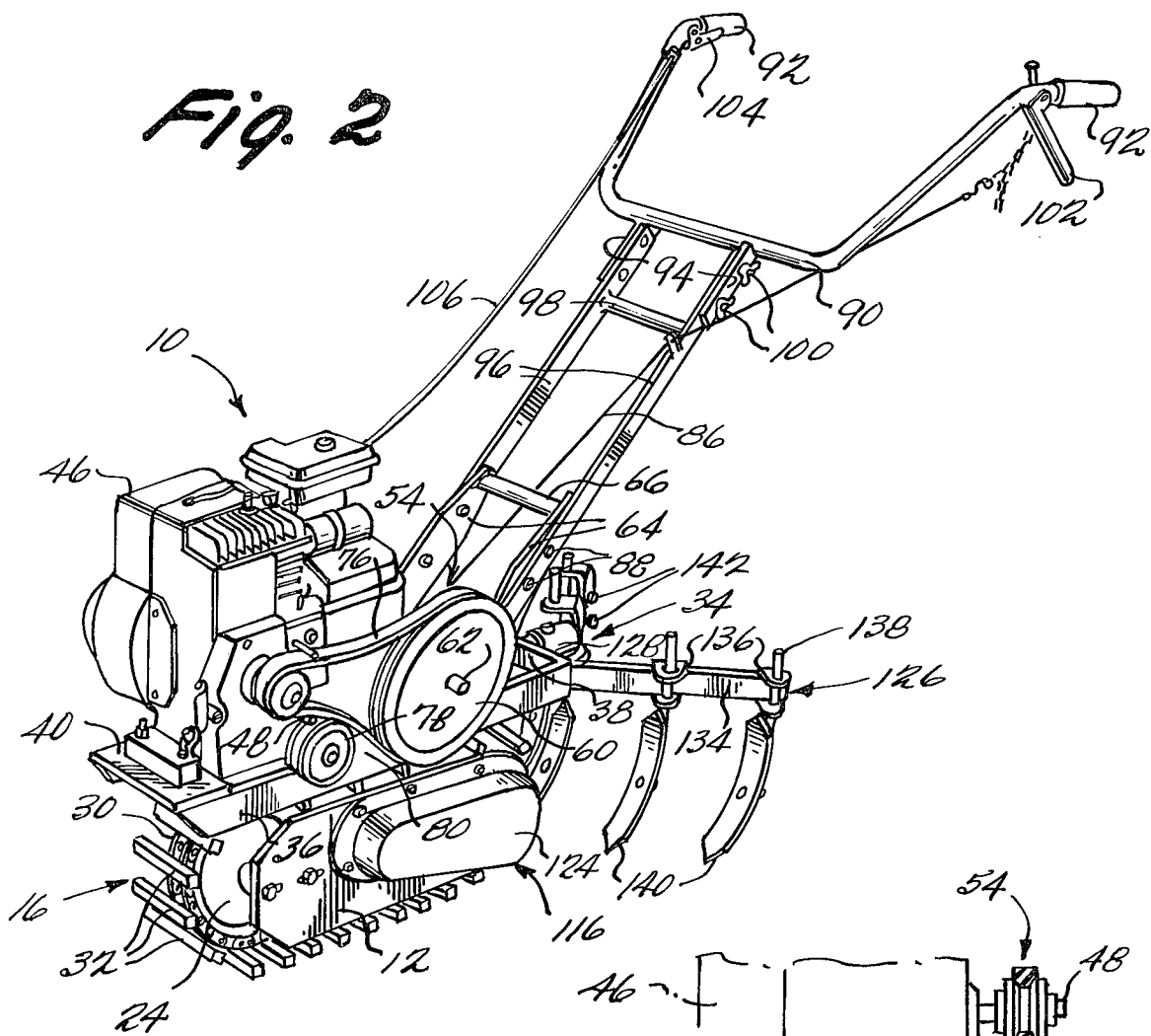
FIG. 2 is a view similar to FIG. 1 illustrating the opposite side of the garden tractor shown in FIG. 1.

Referring now more particularly to the drawings, there is shown in FIGS. 1 and 2 thereof a garden tractor, generally indicated at 10, which is of the type adapted to be steered by a walking attendant and embodies the principles of the present invention. The garden tractor 10, in accordance with the principles of the present invention, embodies a strong central structure in the form of a pair of rectangular plates 12 and a cylindrical member 14 which extends transversely between the central portion of the plates 12 with its axis disposed horizontally and having its ends rigidly secured to the plates 12 so as to maintain them in parallel relation with respect to each other in generally vertical planes and with the longitudinal extent of the plates generally horizontal. While the plates and cylindrical member may be rigidly interconnected in any suitable manner, as best shown in FIG. 4, preferably, the ends of the cylindrical member 14 extend through openings formed in the plates 12 and each such connection is suitably welded. It will be understood that the above-described welded connection could be replaced by a removable threaded connection, if desired.

Figure 5:
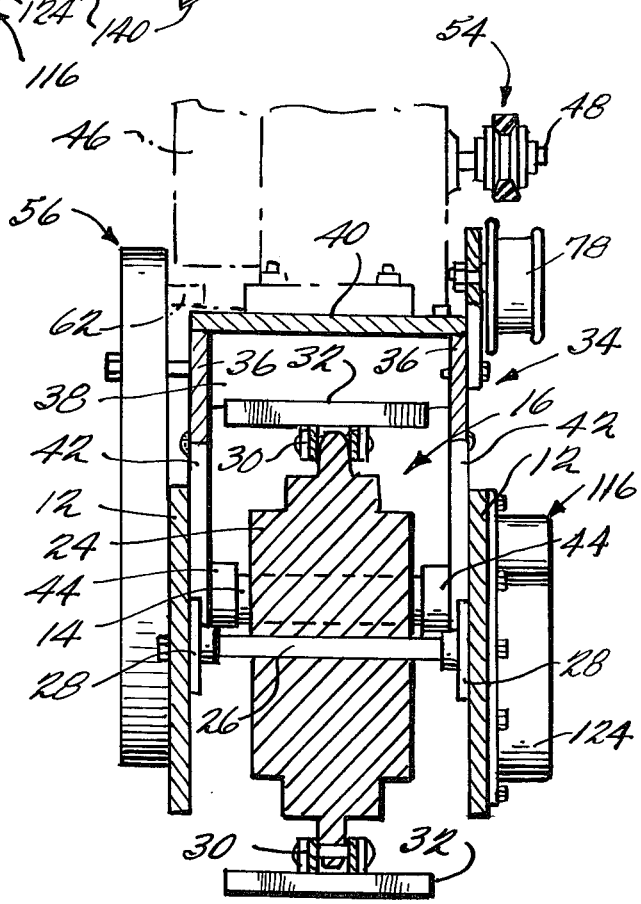
FIG. 5 is a fragmentary sectional view taken along the line 5—5 of FIG. 3.

The central structure, including the plates 12 and cylindrical member 14, serves multiple functions in the completed construction. One of its functions is to support a ground engaging endless track assembly, generally indicated at 16. As best shown in FIGS. 3-5, the assembly 16 includes a rear sprocket wheel 18 having a shaft 20 fixed thereto. The end portions of the shaft 20 are journaled in bearings 22 fixedly carried by the rear end portions of the plates 12. The assembly 16 also includes a forward sprocket wheel 24 which is fixed to a shaft 26. The ends of the shaft 26 are journaled in bearings 28 suitably mounted in the forward end portions of the plates 12 for limited horizontal adjusting movement. The assembly 16 also includes an endless chain 30 trained about the sprocket wheels 18 and 24. Rigidly secured to certain of the links of the chain 30 is a series of transversely extending ground engaging lugs 32. It will be noted that with the rear sprocket wheel 18 mounted between the rear end portions of the plates 12 and the front sprocket wheel 24 mounted between the front end portions of the plates 12, the endless chain 30 trained about the front and rear sprocket wheels will move in an endless path which encircles the cylindrical member 14.

The second function of the central structure including the plates 12 and cylindrical member 14 is to pivotally support an engine and handle frame assembly, generally indicated at 34. The assembly 34 includes a horizontal frame made up of a pair of elongated side frame members 36 rigidly interconnected at their rearward ends by a transverse frame member 38. The front end portion of the two side frame members 36 is rigidly interconnected by a pair of horizontally extending cross plates 40. Rigidly secured to the lower central edge of each side frame member 36 is a rigid depending element 42. Each rigid element 42 has its upper edge welded to the associated side frame member and has its lower end suitably apertured to receive therein a sleeve 44. It will be understood that each sleeve 44 is adapted to be connected to the associated depending element 42, as by welding, in a manner similar to the interconnection of the cylindrical member 14 with the base plates 12. It will also be understood that the order of assembly is such that the sleeves 44 can be mounted over the exterior cylindrical periphery of the cylindrical member 14 between the plates 12. In this way the sleeves 44 are rotatably carried by the cylindrical member 14 for pivotal movement about the axis of the cylindrical member.

It will be further understood that the assembly 34 includes an internal combustion engine 46 which is suitably fixedly mounted on the frame members 36 and 40. As best shown in FIGS. 2, 3 and 5, the engine 46 has a laterally extending output shaft 48. The output shaft 48 is releasably drivingly connected with the shaft 20 of the rear sprocket wheel 18 of the endless track assembly 16 by an appropriate motion transmitting mechanism mounted with respect to the rigid central structure including the plates 12 and cylindrical member 14, so as to accommodate the aforesaid pivotal movement of the assembly 34 about the axis of the cylindrical member 14. Accordingly, a third basic function of the cylindrical member 14 is to provide for the mounting of a rotary motion transmitting shaft 50. As best shown in FIG. 4, the shaft 50 extends completely through the cylindrical member 14 and is rotatably mounted therein by a pair of journal bearings 52.

Rotative movement from the engine output shaft 48 is selectively drivingly connected with one end of the shaft 50 by an engageable and releasable belt and pulley assembly, generally indicated at 54, and a sprocket and chain assembly, generally indicated at 56. As best shown in FIGS. 2–5, the belt and pulley assembly 54 includes a first pulley 58 fixedly mounted on the engine output shaft 48, and a relatively large pulley 60 fixedly mounted on one end of an intermediate shaft 62. As best shown in FIGS. 3 and 4, the mounting of the shaft 62 is preferably adjustable with respect to a pair of upwardly and rearwardly extending members 64 forming a part of the handle of the assembly 34. The lower edge of each member 64 is fixedly welded to the upper central edge of an associated longitudinal side frame member 36 and the upwardly extending ends thereof are rigidly interconnected by a tube 66. Extending upwardly and forwardly from each member 64 is an apertured mounting lug 68. A bolt 70 extends through each of the apertured lugs and has an end thereof welded to a tube 72. The shaft 62 is suitably journaled within the tube 72 and is capable of adjustment by movement of the bolts 70 through the apertured lug 68. A pair of nuts 74 is provided for the purpose of fixedly securing the bolts 70 in their desired position of adjustment.

The engageable and releasable belt and pulley assembly 54 includes an endless belt 76 which is trained about the pulleys 58 and 60 and an engaging and releasing pulley 78 rotatably mounted on the end of an arm 80 which is pivoted, as indicated at 82, to the central portion of the associated side frame member 36. When the arm 80 is moved about the pivotal axis 82 in a clockwise direction, as viewed in FIG. 3, pulley 78 will engage the outer periphery of the belt 76 and move the same inwardly so that the normally loose engagement of the belt about the pulleys 58 and 60 is tightened, thus effecting a driving relationship between the pulleys 58 and 60 by the belt 76.

In order to effect this movement of the engaging and releasing pulley 78 there is provided on the arm 80 an upstanding lug 84 to which is connected one end of an elongated actuated wire 86. The wire extends upwardly and rearwardly to a convenient position of access with respect to the handle of the assembly 34. In this regard it will be noted that the handle includes a generally Y-shaped handle unit which is longitudinally adjustably secured to the handle elements 64, as by pairs of bolts 88. As shown, the handle unit consists of a generally U-shaped handlebar 90 similar in construction to the handlebar of a bicycle, providing at its ends two spaced hand grips 92. The bight portion of the handlebar 90 is provided with two downwardly and forwardly extending bars 94 which, in turn, are rigidly connected with a pair of handle frame members 96. The lower ends of the handle frame members 96 are connected to the elements 64 by the bolts 88, whereas the upper ends thereof are rigidly interconnected by a tube 98 and have a detachable connection with the bars 94, as by bolts 100. The actuating wire 86 extends upwardly and rearwardly to an actuated member 102 which is pivoted to the handlebar 90 adjacent the left-hand hand grip 92. A throttle control actuating member 104 is pivoted to the handlebar 90 adjacent the right-hand hand grip, the throttle control member 104 having one end of a Bowden wire assembly 106 connected therewith, the opposite end of which extends to the throttle control of the engine 46.

Sprocket and chain assembly 56 includes a small sprocket wheel 108 which is fixed to the end of the shaft 62 opposite from the end to which the pulley 60 is attached. A large sprocket wheel 110 is fixed to the associated end of the shaft 50 and a chain 112 is trained about the two sprocket wheels. As previously indicated, the adjustment provided by the bolts 70 and nuts 74 functions as a tightener for the chain. Preferably, a shield or guard plate 114 is suitably fixed to the frame member 36 of the assembly 34 and extends over the chain 112 and two sprocket wheels 108 and 110.

A sprocket and chain assembly, generally indicated at 116, which is similar to the assembly 56, is provided for drivingly connecting the shaft 50 with the shaft 20 of the rear sprocket wheel 18 for the purpose of effecting driving movement of the endless track assembly 16. As shown, the assembly 116 includes a small sprocket wheel 118 which is fixed to the end of the shaft 50 opposite the end to which the large sprocket 110 is fixed. The associated end of the shaft 20 of the rear sprocket wheel 18 is provided with a sprocket wheel 120 of a size larger than the sprocket wheel 118 but less than the size of the sprocket wheel 18. A chain 122 is trained about the two sprocket wheels 118 and 120 and the entire assembly is covered with a shield or guard plate 124 suitably fixed to the associated base plate 12.

The tractor 10 is adapted to carry suitable cultivating implements as well as a variety of other implements as is well known in the art. To exemplify the connection of the implements with the tractor there is shown in FIGS. 1–3 a cultivator assembly, generally indicated at 126. The hitch of the assembly 126 is in the form of a centrally located tubular member 128 adapted to engage over a hitch pin 130 fixed to the central portion of the frame member 38 and extending horizontally rearwardly therefrom. The hitch pin 130 is provided with a vertical aperture for receiving a connecting bolt 132 which also extends through the tubular hitch member 128. Fixed to the lower end of the hitch tube 128, as by welding or the like, is the apex of a V-shaped cultivator frame member 134. Mounted along each leg of the V-shaped frame member 134 is a plurality of U-shaped clamps 136. The legs of each U-shaped clamp 136 are formed with registering vertically extending openings for receiving the upper end of a standard 138, the lower end of which has a cultivator shovel 140 fixed thereto. The bight portion of each U-shaped clamp 136 is formed with a central threaded aperture for receiving a bolt 142 which serves to fixedly secure the standard both vertically and longitudinally along the length of the associated frame member 134.

In operation, after the engine 46 has been started, the operator grasps the handle grips 92 and by moving the actuating lever 102 moves the pulley 78 of the assembly 54 which drivingly connects the output shaft 48 of the engine 46 with the shaft 62, as aforesaid. The shaft 62 is, in turn, drivingly connected with the shaft 50 through the sprocket and chain assembly 56 and the shaft 50 is, in turn, drivingly connected with the shaft 20 of the rear sprocket wheel 18 of the ground engaging track assembly 16 through the sprocket and chain assembly 116. It will be noted that the arrangement enables the motion of the output shaft of the engine to be transmitted to the drive shaft 20 continuously while at the same time providing for the pivotal movement of the assembly 34 about the axis of the cylindrical member 14 by virtue of the connection of the sleeves 44 about the exterior periphery of the cylindrical member. In this way, the operator is enabled to cause the operation of the endless track assembly 16 to effect forward movement of the tractor. Since the arrangement accommodates the pivotal movement of the assembly 34, the operator is enabled to engage the cultivator shovels 140 with the ground at any appropriate depth of operation by simply providing appropriate downward pressure on the hand grips 92 as the operator walks along behind the tractor. In this way, the operator is enabled to proceed down a row within a garden, cultivating as the operation is continued. The tractor 10 can be steered by the attendant by applying appropriate guiding pressure to the hand grips 92. It will also be noted that by lifting upwardly on the handle, the cultivating shovels 140 can be moved out of ground engagement, permitting the operator to maintain forward steering travel in areas where earth digging or other implement engagement is not required.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A garden tractor comprising:
   a pair of generally rectangular plates,
   a cylindrical member extending transversely between the central portion of said plates with its axis disposed horizontally and having its ends rigidly secured thereto so as to maintain said plates in parallel relation with respect to each other in generally vertical planes and with the longitudinal extent thereof generally horizontal,
   an endless track assembly carried by and between said plates for driving movement in an endless path encircling said cylindrical member,
   a generally horizontally extending frame disposed above said plates and said endless track assembly including a sleeve fixedly carried in depending relation to the central portion of said horizontally extending frame on each side thereof and rotatably mounted around an associated end of said cylindrical member, and a handle structure extending upwardly and rearwardly from said horizontally extending frame by which an operator is enabled to pivot said horizontally extending frame about the axis of said cylindrical member by virtue of the mounting of said sleeves around said cylindrical member,
   a first shaft mounted on said horizontally extending frame for rotational movement about an axis parallel to the axis of said cylindrical member,
   an internal combustion engine carried by said horizontally extending frame and releasably drivingly connected with said first driven shaft,
   a second shaft mounted within said cylindrical member with its ends extending transversely outwardly of said plates for rotation about an axis concentric with the axis of said cylindrical member,
   first endless drive means extending between said first shaft and an end of said second shaft, and
   second endless drive means extending between an end of said second shaft and said endless track assembly.

2. A garden tractor as defined in claim 1 wherein said handle structure includes a pair of mounting plates fixed at their lower ends to said frame and extending upwardly and rearwardly therefrom and a generally Y-shaped handle assembly having the stem portion thereof removably and longitudinally adjustably fixed to said mounting plates.

3. A garden tractor as defined in claim 2 wherein said handle assembly includes a U-shaped handle bar.

4. A garden tractor as defined in claim 1 wherein the ends of said cylindrical member are welded to said plates.

5. A garden tractor as defined in claim 1 wherein said internal combustion engine is releasably drivingly connected to said first shaft by an engaging and releasing belt and pulley assembly.

6. A garden tractor as defined in claim 1 wherein said first endless drive means comprises a first sprocket and chain assembly having a shield plate thereover.

7. A garden tractor as defined in claim 6 wherein said second endless drive means comprises a second sprocket and chain assembly having a shield plate thereover.

8. A garden tractor comprising:
   a pair of generally rectangular plates,
   a cylindrical member extending transversely between the central portion of said plates with its axis disposed horizontally and having its ends rigidly secured thereto so as to maintain said plates in parallel relation with respect to each other in generally vertical planes and with the longitudinal extent thereof generally horizontal;
   an endless track assembly carried by said plates including a rear sprocket wheel mounted between the rear end portions of said plates for rotation about an axis parallel with the axis of said cylindrical member, a forward sprocket wheel mounted between the forward end portions of said plates for rotation about an axis parallel with the axis of said cylindrical member, an endless chain trained about said front and rear sprocket wheels and encircling said cylindrical member and a series of transversely extending ground engaging lugs carried by said chain,
   a generally horizontally extending frame disposed above said plates and said endless track assembly including a pair of side frame members extending longitudinally from front to rear, a depending element fixed to the central portion of each side frame member, a sleeve fixedly carried by each depending element and rotatably mounted around an associated end of said cylindrical member, and a handle structure extending upwardly and rearwardly from said horizontally extending frame by which an operator is enabled to pivot said horizontally extending frame about the axis of said cylindrical member by virtue of the mounting of said sleeves around said cylindrical member, a first shaft mounted on said horizontally extending frame for rotational movement about an axis parallel to the axis of said cylindrical member, an internal combustion engine carried by said horizontally extending frame and releasably drivingly connected with said first driven shaft, a second shaft mounted within said cylindrical member with its ends extending transversely outwardly of said plates for rotation about an axis concentric with the axis of said cylindrical member, first endless drive means extending between said first shaft and one end of said second shaft, and second endless drive means extending between the other end of said second shaft and said rear sprocket wheel.

* * * * *